United States Patent [19]

Socha et al.

[11] Patent Number: 5,755,405
[45] Date of Patent: May 26, 1998

[54] PARACHUTE PROMOTION

[75] Inventors: Kathleen Fitzsimmons Socha, Smyrna; Robert T. Gilmer; Dennis J. Adamovich, both of Atlanta, all of Ga.

[73] Assignee: The Coca-Cola Company, Atlanta, Ga.

[21] Appl. No.: 653,015

[22] Filed: May 24, 1996

[51] Int. Cl.[6] ............................................. B64D 17/02
[52] U.S. Cl. ............................................ 244/142; 244/145
[58] Field of Search ....................... 244/142, 138 R, 244/145; 40/310, 216, 212; 102/337, 354, 387

[56] References Cited

U.S. PATENT DOCUMENTS

| | | |
|---|---|---|
| 286,718 | 10/1883 | Linton . |
| 1,533,912 | 4/1925 | Heiss . |
| 1,536,722 | 5/1925 | Miller . |
| 1,618,613 | 2/1927 | Turner . |
| 1,712,296 | 5/1929 | Dapp . |
| 1,757,247 | 5/1930 | Hoffman . |
| 1,793,729 | 2/1931 | Askam . |
| 2,110,061 | 3/1938 | Gentzel ................................. 102/337 |
| 2,314,914 | 3/1943 | Wilson . |
| 2,509,182 | 5/1950 | Annable . |
| 2,993,667 | 7/1961 | Cushman . |
| 3,383,017 | 5/1968 | Krings . |
| 3,536,279 | 10/1970 | Goalwin ................................. 244/142 |
| 4,778,131 | 10/1988 | Calianno . |
| 5,149,019 | 9/1992 | Stenlund . |
| 5,188,315 | 2/1993 | Foitzik et al. .......................... 102/387 |

FOREIGN PATENT DOCUMENTS

| | | |
|---|---|---|
| 298078 | 2/1992 | Germany . |
| 508511 | 1/1955 | Italy . |
| 1443196 | 7/1976 | United Kingdom . |

*Primary Examiner*—Robert J. Oberleitner
*Assistant Examiner*—Tien Dinh

[57] ABSTRACT

A parachute promotion method and article provide for delivery of promotional materials to a gathering of people in a way which creates a stunning and colorful display. In the method, parachute assemblies carrying promotional materials are released in substantial numbers from a suitable elevation for descent toward people below who have gathered, as in a stadium. The parachute assemblies may be released from an aircraft, from a descending parachutist or from an elevated structure. The parachute assemblies each comprise a parachute canopy and suspension element formed of flexible sheet material and a container, such as a beverage bottle, provided with a removable closure fastened to a central portion of the suspension element. The promotional materials are carried in the container.

26 Claims, 4 Drawing Sheets

PARACHUTE PROMOTION

BACKGROUND OF THE INVENTION

The present invention relates to a method and assembly for delivering promotional materials to large assembled crowds of people in a creative and eye-catching way. More specifically, the present invention relates to a method and apparatus for delivering promotional material to large crowds of assembled spectators in outdoor stadiums through the use of parachute assemblies carrying the promotional materials.

Conventionally, it is known to deliver promotional materials to large crowds of spectators entering outdoor stadiums by handing out discount coupons or leaflets to the spectators as they enter the stadium. However, this method of handing out promotional materials, such as discount coupons for beverages or other food products to be purchased, can be ineffective, because it may be a nuisance to the persons who are entering the stadium and are in a hurry to get to their seats to observe the featured events. Even if one is successful in handing out coupons to these persons and they are appreciative of receiving them once they realize what they are, this method of delivering the promotional materials to them is not likely to leave a lasting and favorable impression.

A need in the art exists for an improved method for delivering these promotional materials to large gatherings of spectators in outdoor stadiums, particularly a method in which the delivery of the promotional materials will itself constitute a memorable spectacle and will engage the interest of the spectators, and attract attention to the promoted products, to an extent which may be commensurate with their interest in the event they are attending. A very effective way to attract their attention is to stage a drop of the promotional materials out of the sky so that they descend under the force of gravity for receipt by these spectators. It would be especially effective if the promotional materials could be carried by parachute devices so that the promotional materials gently floated into the stadium and were fairly and evenly distributed to the spectators. If the parachute devices were brightly colored, a stunning and colorful dynamic display could be achieved.

SUMMARY OF THE INVENTION

Accordingly, it is a primary object of the present invention to provide a method and assembly for delivering promotional materials to large crowds of assembled people such as spectators in outdoor stadiums using some form of parachute assemblies.

It is another object of the present invention to provide a method and apparatus for delivering promotional materials to spectators in a stadium through the use of unique parachute assemblies which also constitute advertising media for the promotional materials delivered.

The foregoing objects of the present invention, and others as well, are realized by providing a parachute assembly for use as a promotional device comprising: a first panel of flexible sheet material substantially impervious to the flow of air therethrough, said first panel forming a parachute canopy for trapping air on its underside as the parachute assembly falls under the force of gravity from an elevated position toward a target area; a second panel of flexible sheet material having openings permitting substantially free passage of air therethrough, said second panel being of similar size and shape as the first panel and joined about its periphery to the underside and periphery of the first panel to form a suspension element by which a load may be suspended from the parachute canopy; and a container coupled to the second panel, said container being capable of accommodating promotional materials therein and being openable to permit removal of the promotional materials.

The objects of the present invention are further realized by providing a method of delivering promotional materials to an assembled crowd of potential customers comprising the steps of: providing a supply of promotional materials in parachute assemblies; providing at least one parachutist with a supply of the parachute assemblies; dropping the at least one parachutist from an aircraft toward the assembled crowd; and dropping the parachute assemblies from the supply of the at least one parachutist toward selected areas of the assembled crowd.

The detailed description which follows will reveal the further scope of the present invention. However, it should be understood that the specific examples described are illustrative only, and various changes and modifications within the spirit and scope of the invention may become apparent to persons skilled in the art who have had the benefit of this disclosure.

DESCRIPTION OF THE PREFERRED EMBODIMENTS

Figure 1:
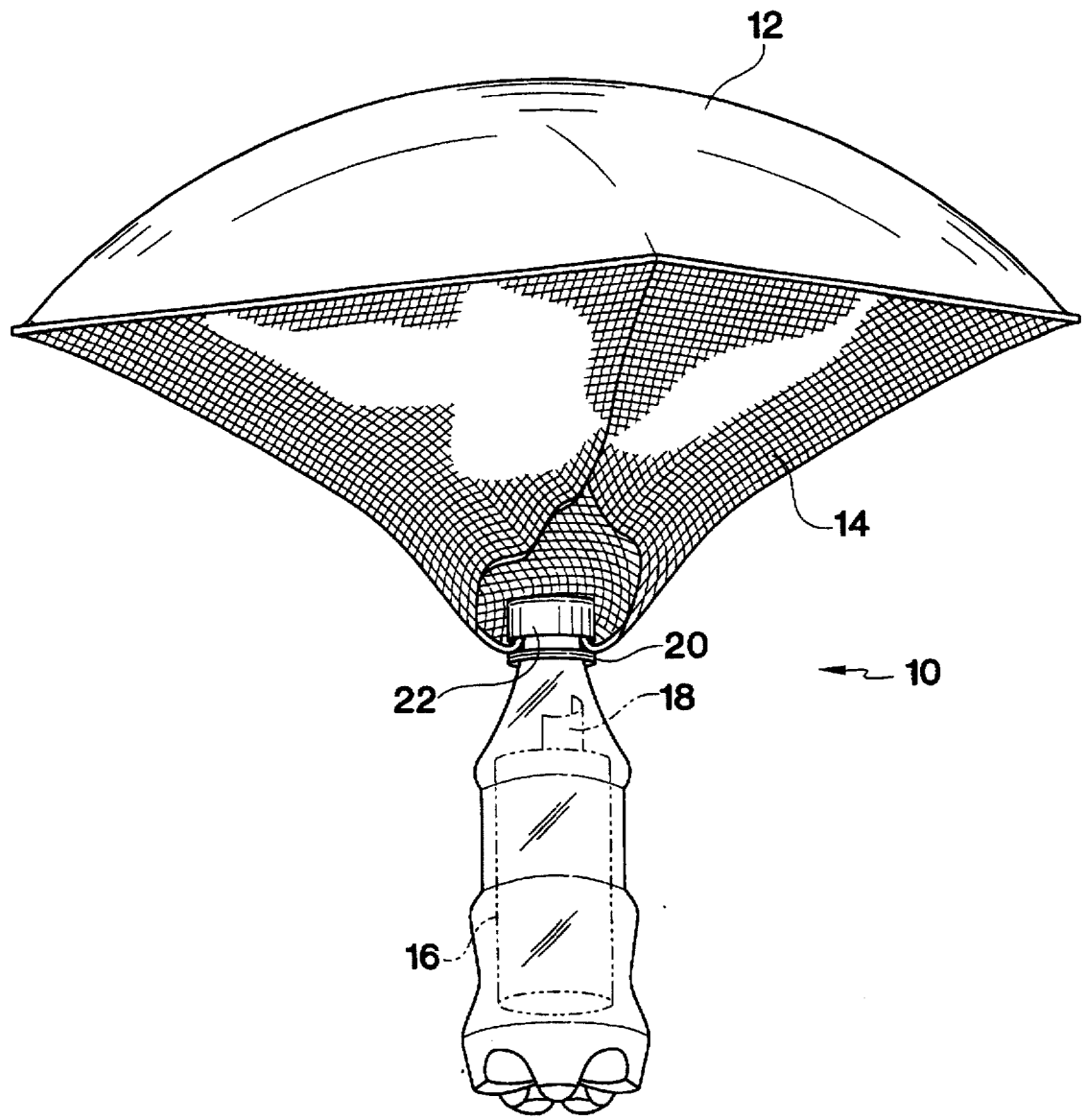
FIG. 1 illustrates the parachute assembly of the present invention, partly cut-away, in its open condition as it appears when falling toward the ground.

As illustrated in FIG. 1, a preferred embodiment of the parachute assembly 10 of the present invention comprises a parachute canopy 12 formed by a first panel of thin flexible sheet material which is substantially impervious to the passage of air. The canopy is secured at its edges to a parachute suspension element 14 formed by a confronting second panel of thin flexible sheet material with openings through which air can pass freely. A closely woven nylon fabric is an example of a sheet material which is suitable for use in the canopy, and a coarsely woven nylon mesh fabric is an example of a sheet material which is suitable for use in the suspension element, respectively.

Secured to the center of the suspension element is a container 16 housing promotional materials 18 to be delivered to recipients who may, for example, be in a gathering of spectators at a sporting event. As illustrated, the container may be a transparent bottle through which the promotional materials may be viewed. The bottle includes a neck 20 to which a cap 22 is fastened, as by threads.

Figure 2:
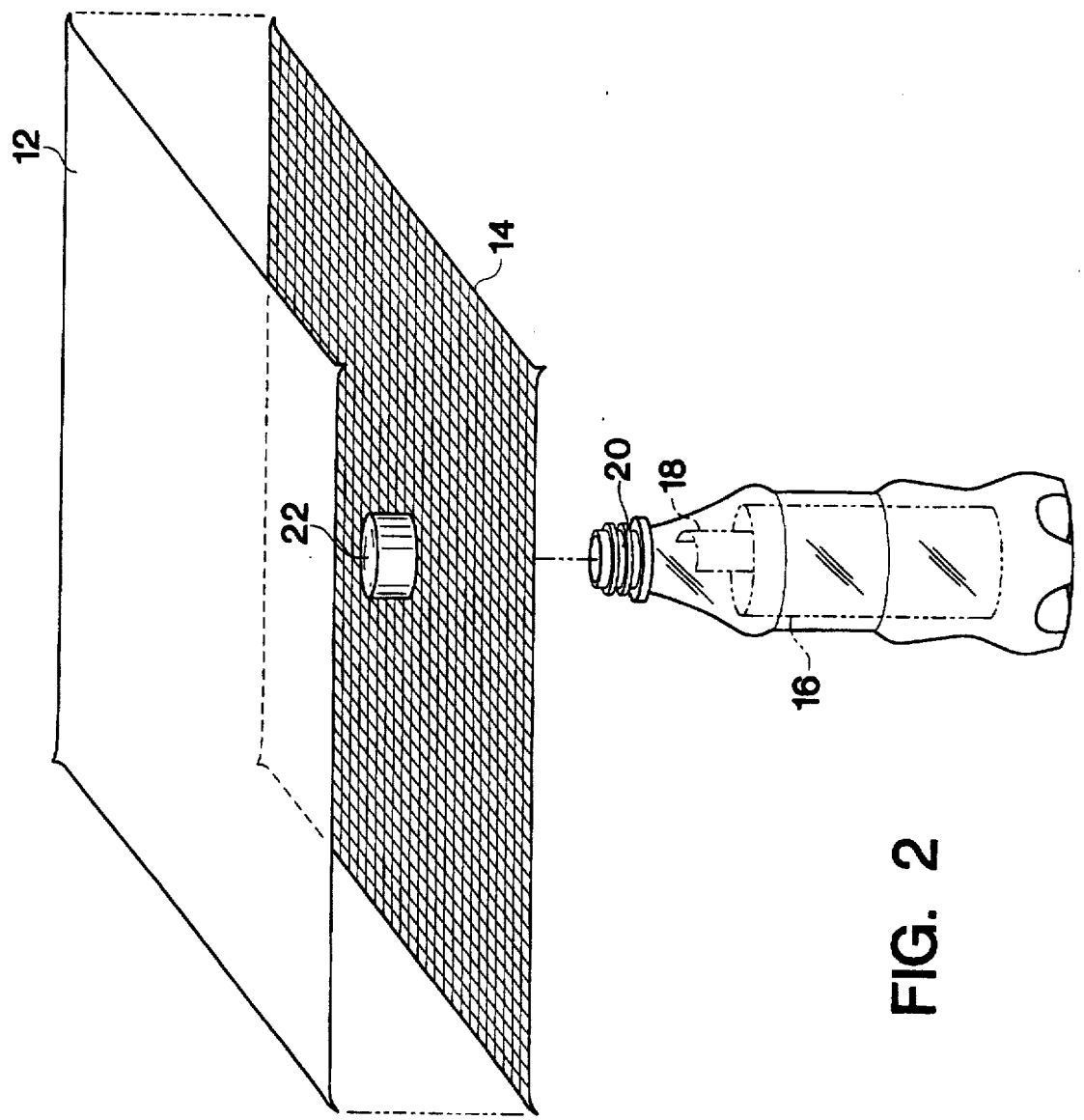
FIG. 2 is an exploded illustration of the elements of the parachute assembly of the present invention.

As illustrated in FIGS. 1, a portion of the suspension element is interposed between the threads of the bottle neck and the cap to thereby couple the bottle to the parachute assembly. As best illustrated in FIG. 2, prior to final assembly, the internally threaded bottle cap 22 may be loosely confined in the space between the two panels. The flexibility of the thin sheet materials forming two panels permits manipulation of the bottle cap through the panels for positioning the cap at the center of the suspension element panel 14 and then threading the cap onto the neck 20 of bottle 16 with the mesh material interposed between the internal threads of the cap and the external threads on the bottle neck.

In the illustrated parachute assembly, the panels forming the parachute canopy and suspension element are square, a configuration which permits especially simple and economical production of the parachute assembly. However, other shapes, such as other regular polygons, circles and rectangles may also be used.

Figure 3:
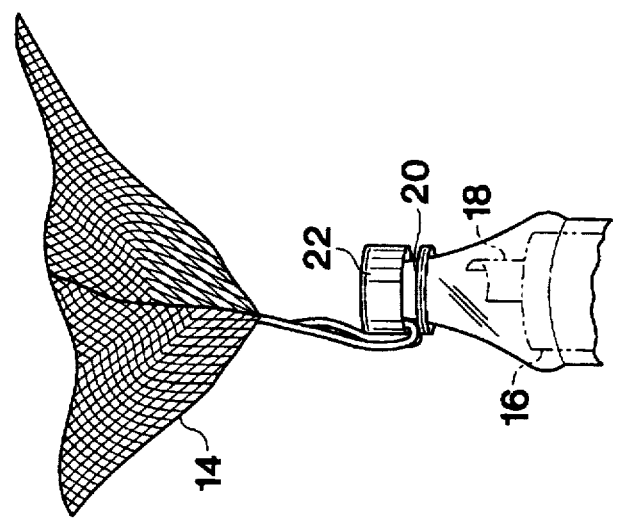
FIG. 3 illustrates in detail an alternative connection between the parachute suspension element and the bottle cap of the parachute assembly of the present invention.

As illustrated FIG. 3, the bottle 16 may alternatively be coupled to the parachute suspension element 14 by a tether strand 24 extending between the center of the suspension element and the bottle cap. The strand may be fastened to the suspension element as by knotting or sewing. As illustrated, the other end of the strand may be interposed between the bottle neck and cap. The strand may, however, be otherwise fastened to the cap, as by an adhesive.

Advertising leaflets, prizes, admission tickets, coupons and other items which may be attractive to intended recipients, while advancing the interests of the promoter, may be placed into the bottle before the cap is fastened onto the bottle neck. The parachute and container can be kept and reused, as a toy, for example, and will continue to serve as a favorable reminder of the promoter.

Figure 4:
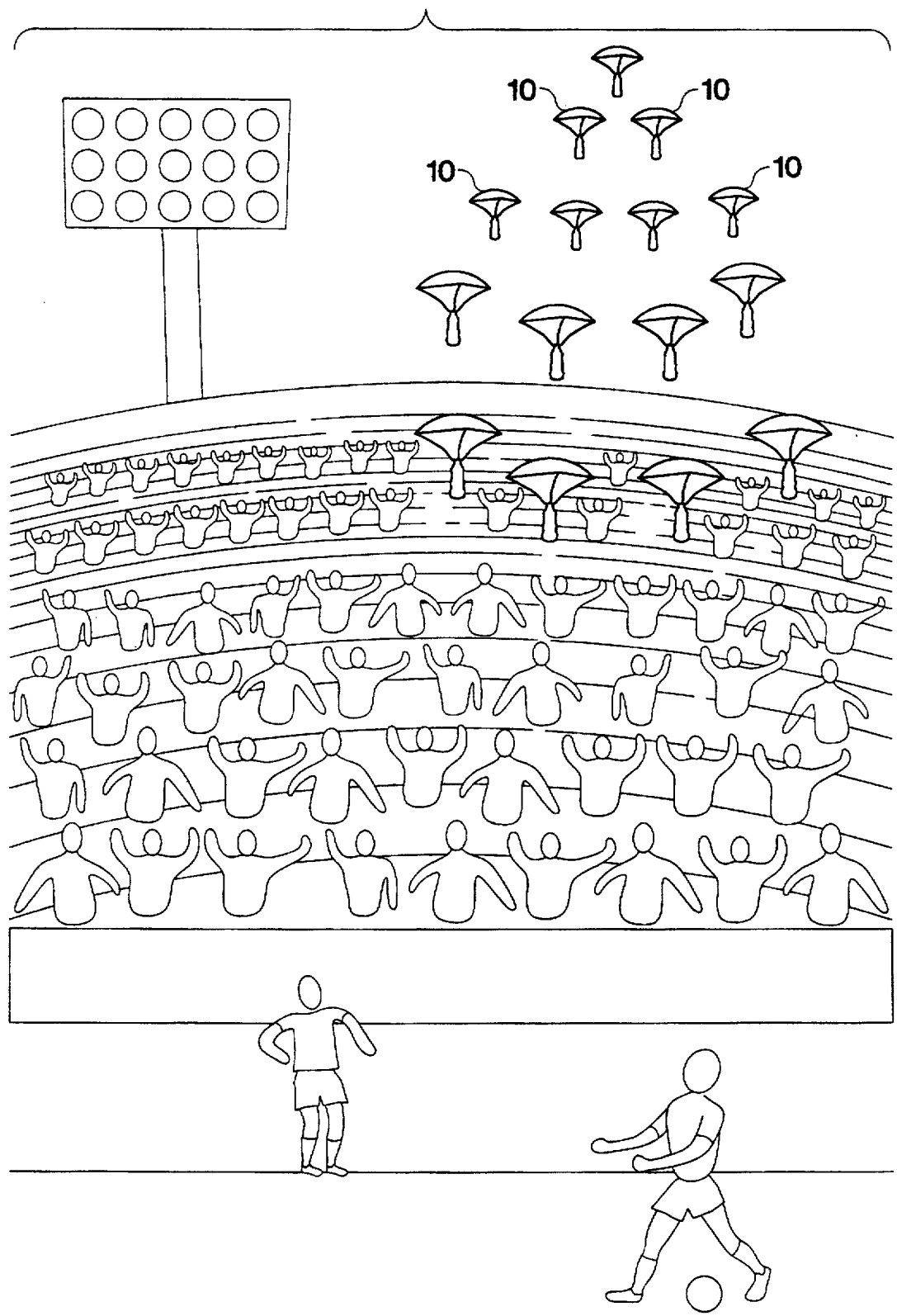
FIG. 4 illustrates an example of the deployment of the parachute assemblies of the present invention from an elevated position over a gathering of people.

As illustrated in FIG. 4, a number of parachute assemblies 10 having been released from an aircraft (not shown) overhead, are drifting downwardly toward people who have gathered in a stadium to observe an event such as a sporting competition. Preferably, the materials forming the parachute assemblies will be brightly colored, and a large number of the parachute assemblies floating groundward will afford a colorful and stunning dynamic display which is certain to engage the attention of people gathered below. The parachute assemblies may be released from various types of aircraft, including fixed wing airplanes, helicopters, dirigibles and hot air balloons.

Other techniques may be employed for releasing the parachute assemblies for descent to recipients gathered below. For example, the parachute assemblies may be held to the underside of a stadium roof or overhang by a releasable sling or some other container from which they may be released at will. The parachute assemblies may be released from a container held at an elevated position by a building column, a pole or a construction crane.

Figure 5:
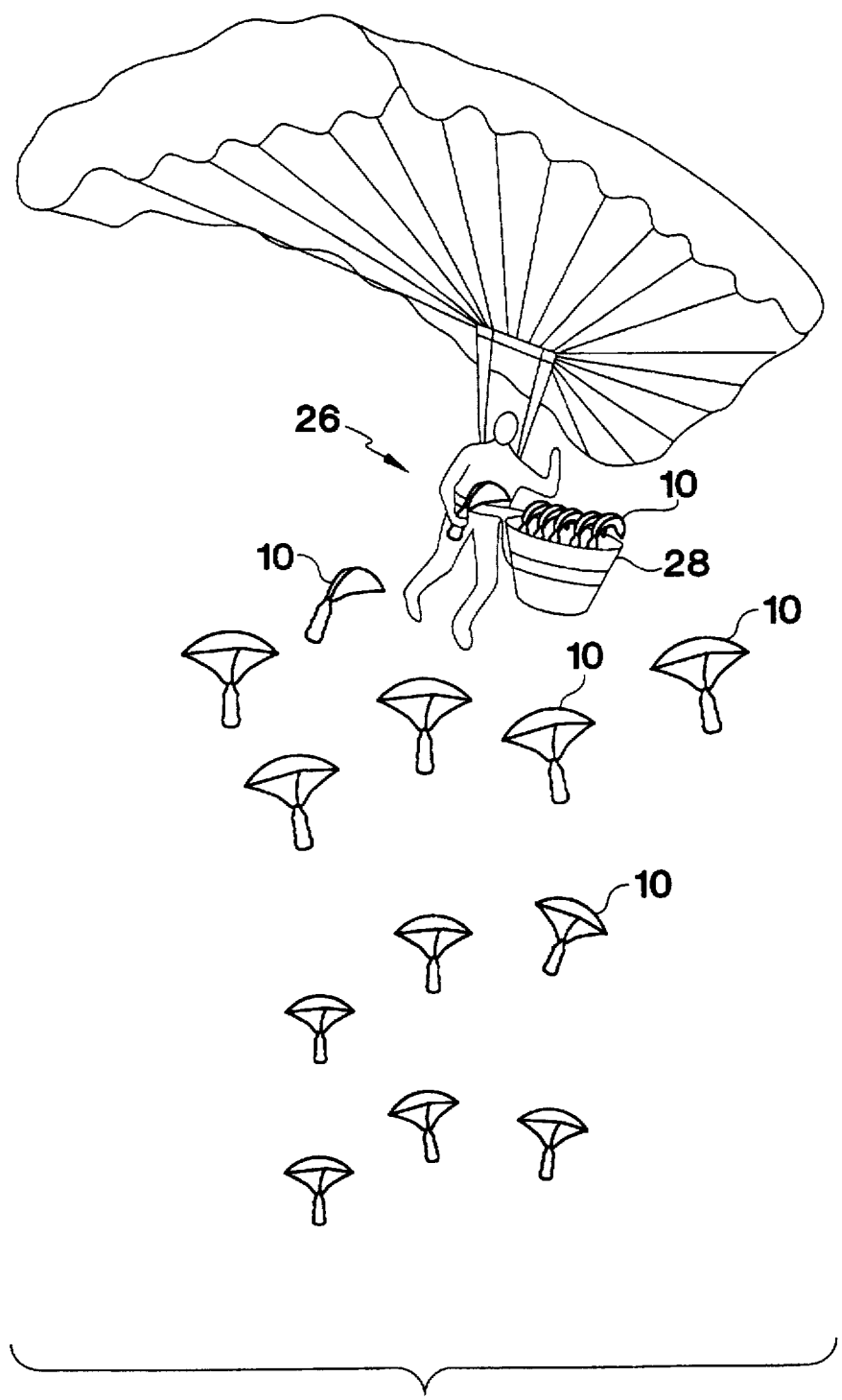
FIG. 5 illustrates a descending parachutist deploying the parachute promotion assemblies of the present invention.

The parachute assemblies are light in weight and, when released outdoors, may be blown off course during their descent. To guard against this occurrence and to help ensure that the parachute assemblies reach their intended recipients, they may be released by a descending parachutist 26, as illustrated in FIG. 5. The parachutist, having jumped from an aircraft and descending toward a gathering of people below, carries a suitable container 28 from which the parachute assemblies may be deployed at a suitable elevation, one at a time or several at once, as desired. The parachutist, if colorfully attired, will also contribute to the visual impact of the falling parachute display.

What is claimed is:

1. A parachute assembly for use as a promotional device comprising:

A first panel of flexible sheet material substantially impervious to the flow of air therethrough, said first panel forming a parachute canopy for trapping air on its underside as the parachute assembly falls under the force of gravity from an elevated position toward a target area;

a second panel of flexible sheet material having openings permitting substantially free passage of air therethrough, said second panel being of similar size and shape as the first panel and joined about its periphery to the underside and periphery of the first panel to form a suspension element by which a load may be suspended from the parachute canopy; and a container coupled to the second panel, said container being capable of accommodating promotional materials therein and being openable to permit removal of the promotional materials.

2. The parachute assembly of claim 1 wherein the container comprises transparent walls which permit viewing of the container contents.

3. The parachute assembly of claim 1 wherein the container is in the shape of the product being promoted.

4. The parachute assembly of claim 3 wherein the container is a bottle provided with a removable cap thereon.

5. The parachute assembly of claim 4 wherein the removable cap is disposed on a neck of the bottle.

6. The parachute assembly of claim 4 wherein the removable cap is threaded onto a neck of the bottle.

7. The parachute assembly of claim 4 wherein the bottle contains promotional material in the form of coupons related to purchase of the product.

8. The parachute assembly of claim 1 wherein the first panel comprises a closely woven fabric.

9. The parachute assembly of claim 1 wherein the second panel comprises a coarsely woven mesh fabric.

10. The parachute assembly of claim 4 wherein the cap of the bottle is connected to the second panel.

11. The parachute assembly of claim 10 wherein a portion of the second panel is interposed between the cap and the bottle neck.

12. The parachute assembly of claim 6 wherein the cap is tethered to the second panel.

13. A method of delivering promotional materials to an assembled crowd of potential customers comprising the steps of:

providing a supply of promotional materials in parachute assemblies;

providing at least one parachutist with a supply of the parachute assemblies;

dropping the at least one parachutist from an aircraft toward the assembled crowd; and dropping the parachute assemblies from the supply of the at least one parachutist toward selected areas of the assembled crowd.

14. The method of claim 13 wherein the selected areas are substantially evenly distributed.

15. The method of claim 13 wherein the crowd is assembled in a stadium.

16. The method of claim 13 wherein each parachute assembly includes:

a first panel of flexible sheet material substantially impervious to the flow of air therethrough, said first panel forming a parachute canopy for trapping air on its underside as the parachute assembly falls under the force of gravity from an elevated position toward a target area;

a second panel of flexible sheet material having openings permitting substantially free passage of air therethrough, said second panel being of similar size and shape as the first panel and joined about its periphery to the underside and periphery of the first panel to form a suspension element by which a load may be suspended from the parachute canopy; and a container coupled to the second panel, said container being capable of accommodating promotional materials therein and being openable to permit removal of the promotional materials.

17. The method of claim 16 wherein the container comprises transparent walls which permit viewing of the container contents.

18. The method of claim 16 wherein the container is in the shape of the product being promoted.

19. The method of claim 18 wherein the container is a bottle provided with a removable cap thereon.

20. The method of claim 19 wherein the bottle contains promotional material in the form of coupons related to purchase of the product.

21. The method of claim 16 wherein the first panel comprises a closely woven fabric.

22. The method of claim 16 wherein the second panel comprises a coarsely woven mesh fabric.

23. The method of claim 19 wherein the cap of the bottle is connected to the second panel.

24. The method of claim 23 wherein a portion of the second panel is interposed between the cap and the bottle neck.

25. The method of claim 23 wherein the cap is tethered to the second panel.

26. A method of delivering promotional materials to an assembled crowd of potential customers comprising the steps of:

introducing promotional materials into each of a plurality of openable containers;

attaching each of the containers with the introduced promotional materials to a parachute to thereby form a plurality of parachute assemblies;

introducing the plurality of parachute assemblies into an aircraft;

operating the aircraft over the assembled crowd; and dropping the plurality of parachute assemblies from the aircraft toward selected areas of the assembled crowd.

* * * * *